United States Patent [19]
Crookshanks

[11] Patent Number: 4,809,194
[45] Date of Patent: Feb. 28, 1989

[54] IMAGE PROCESSING SYSTEM AND METHOD USING MODULATED DETECTOR OUTPUTS

[75] Inventor: Rex J. Crookshanks, Palos Verdes Estates, Calif.

[73] Assignee: Hughes Aircraft Company, Los Angeles, Calif.

[21] Appl. No.: 901,115

[22] Filed: Aug. 28, 1986

[51] Int. Cl.[4] .......................... G06F 15/66; G06F 15/70; G06F 15/336

[52] U.S. Cl. .......................................... 364/518; 364/581; 364/604; 364/713; 382/42

[58] Field of Search ................ 364/713, 727, 822, 827, 364/581, 518, 604; 250/208, 209; 382/42, 45

[56] References Cited

U.S. PATENT DOCUMENTS

| | | | |
|---|---|---|---|
| 3,775,602 | 11/1973 | Alexandridis et al. | 364/727 |
| 4,009,380 | 2/1977 | Bocker et al. | 364/713 X |
| 4,365,310 | 12/1982 | Green | 364/822 |
| 4,542,367 | 9/1985 | Shreve | 364/827 X |
| 4,590,608 | 5/1986 | Chen et al. | 364/727 X |

*Primary Examiner*—Felix D. Gruber
*Attorney, Agent, or Firm*—S. M. Mitchell; M. J. Meltzer; A. W. Karambelas

[57] ABSTRACT

An image processing system 10 includes an array (12) of detectors 14, each of which is designed to produce a current proportional to incident radiation. This system provides image processing at a viable sampling rate even for very large arrays and permits very efficient determination of single element detections.

The modulation functions supplied from a weighted summer (18). The weighted summer applies an invertible matrix of weights to a series of orthonormal Walsh functions defined over a predetermined sampling interval, the Walsh functions being generated by a function generator (16).

The modulated outputs of the array are combined by a summer (20) and distributed among parallel channels by a divider (22). Correlators (24) correlate the signal in each channel with a respective one of the original Walsh functions. The correlated outputs are digitized by analog-to-digital converters for transmission and processing by a digital processor (28). The processor can at least partially reconstruct the detected spatial distribution for output to a display (30).

55 Claims, 5 Drawing Sheets

IMAGE PROCESSING SYSTEM AND METHOD USING MODULATED DETECTOR OUTPUTS

BACKGROUND OF THE INVENTION

The present invention relates to image processing, and more particularly to a system and method for processing data from sparsely excited very large imaging arrays.

One application for very large imaging arrays is in staring sensors for detecting and locating the onset of a radiative event. For example, a satellite based sensor can be used to stare at a region to detect missile or spacecraft launchings or nuclear tests.

However, in order to provide for precise location of the exciting event, very large photo arrays are required. For the applications listed above arrays of 10,000 by 10,000 picture elements (pixels) are called for. To sample such an array at, for example, ten times per second, an overall sampling rate of $10^9$ Hz is required. This creates extreme demands on the subsequent image processing.

While advances in component design will inevitably provide faster sampling and related processing components, imaging objectives exceed the capabilities of even these future components. Accordingly, an objective of the present invention is to provide a system and method for more efficient processing of image data from very large arrays.

SUMMARY OF THE INVENTION

The present invention provides a system and method for efficient processing of image data from large arrays by modulating pixel elements according to respective mutually orthogonal functions. The modulated outputs can be multiplexed to utilize system hardware bandwidth more efficiently and then correlated according to the original modulation functions to obtain the desired image data. The invention is particularly applicable to sparsely excited very large image arrays.

The modulation can be effected by a variety of means, including varying the bias across individual photodiodes or by controlling the percentage of light reaching the photodiodes by, for example, a liquid crystal shutter. The modulated signals can be summed or otherwise multiplexed into one or more channels. By correlating the multiplexed signals according to the original modulation functions, for example, by parallel mixing of the multiplexed signals with respective modulation signals and filtering the results to integrate and remove unwanted terms the desired image data may be obtained.

Such a system can provide for efficient detection and location of illumination or a change in intensity of a signal pixel within a defined sete of pixels. More complex illumination or change patterns can be characterized by further processing. Depending on the particular embodiment, the further processing can involve additional mathematical manipulation or subsequent sampling.

In accordance with the present invention, the demands on sampling hardware are greatly reduced in proportion to the reduction in channels carrying the image data. Minimal processing overhead is incurred in detecting and locating single element events. More complex events can be decoded with further processing.

DESCRIPTION OF THE PREFERRED EMBODIMENTS

Figure 1:
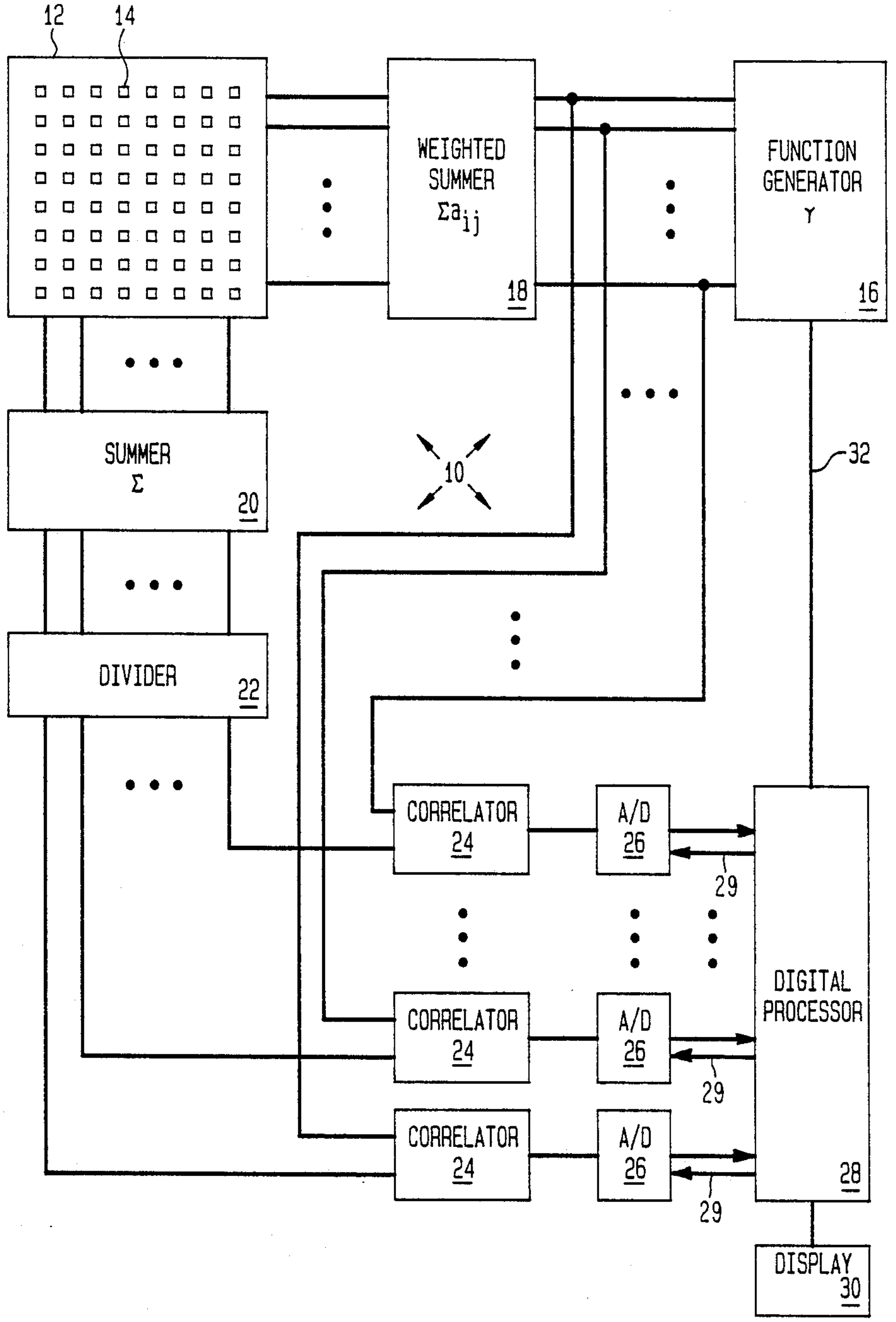
FIG. 1 is a schematic of a signal detection and processing system in accordance with the present invention.

A signal processing system 10 includes a detector array 12 comprising a multitude of detectors 14, as shown in FIG. 1. The array 12 can be a superelement of a much larger array, similar superelements being processed sequentially in the manner described below with respect to array 12. Each detector 14 provides an output as a function of the detected value of a variable referable to an event of interest. For example, the signal processing system can be an image processor and the detectors can be photodiodes which output current as a function of the intensity of incident radiation. The pattern of radiation incident to the array 12 can indicate the source of a radiative event such as a rocket launching.

The signal processing system 10 includes a function generator 16 for generating a set of time functions. In the illustrated system 10, these functions are orthogonal over a predetermined time interval which is short relative to the duration of events to be detected using the array 12. Preferably, the time functions are Walsh functions or an alternative set of functions orthonormal over the predetermined time interval.

A weighted summer 18 accepts as input the orthogonal time functions provided by the function generator and in turn produces a set of modulation functions in the form of weighted sums of the time functions. Preferably, the weights applied by summer 18 define an invertible matrix. For complete decoding, the matrix can be a square N×N matrix, where N is the number of detectors in the array 12 and the number of functions $\gamma_i$ provided by function generator 16.

The array 12 is designed to apply the modulation functions supplied by the weighted summer 18 to each of the detectors 14. For complete decodability, the array 12 can provide that the output of each detector 14 is modulated by a distinct modulation function. For some applications, alternative arrangements can be implemented efficiently. For example, each row of detectors 14 and each column of detectors 14 of array 12 can be assigned a distinct modulation function. In such an embodiment, the array 12 can be arranged so that the output of each detector 14 is modulated by the sum of the respective row and column modulation functions.

Many alternative modulation function-to-detector mapping schemes are also provided for by the present invention.

A current summer 20 or alternative signal combining or multiplexing means is provided to combine the outputs of the detectors 14. Directly or indirectly, the output of the summer 20 is replicated over multiple channels by a signal divider 22 or related means.

The parallel outputs of the divider are directed to correlators 24. Each correlator 24 correlates a divider output with a respective one of the time functions $\gamma_i$ provided by the function generator 16. The correlators have the effect of isolating components of the summed signal according to respective time functions $\gamma_i$.

The correlator outputs can then be converted to digital form by analog-to-digital converters 26. The converters 26 form part of a means of sampling the output of correlators 24 over an interval of time over which the time-varying functions are orthogonal. The sampling of the converters 26 can be synchronized over the predetermined interval of orthogonality for the time functions. This synchronization may be accomplished using any well-known technique such as by sending appropriate control signals to the A/D converters 26 from the processor 28 over lines 29. The digitized correlator outputs can then be processed to obtain information as to the spatial variable of interest. In an embodiment providing for complete decoding, a matrix inversion can yield a complete spatial distribution. In other cases, more limited information can be obtained by pair-wise dividing selected correlator outputs.

In the preferred embodiment 10, both complete and partial decoding are provided for. The partial decoding, which is relatively rapid, identifies which detector has detected a change in the value of the incident variable when only one detector has detected such a change. The information, such as images, can be directed to a display 30 or other readout device.

Provision is made for the digital processor 28 to control the time function generator 16 via line 32. This line 32 can be used to switch certain time functions on and off, for example, to allow more complete decoding by successive samplings in cases where multiple detectors are excited concurrently.

Figure 2:
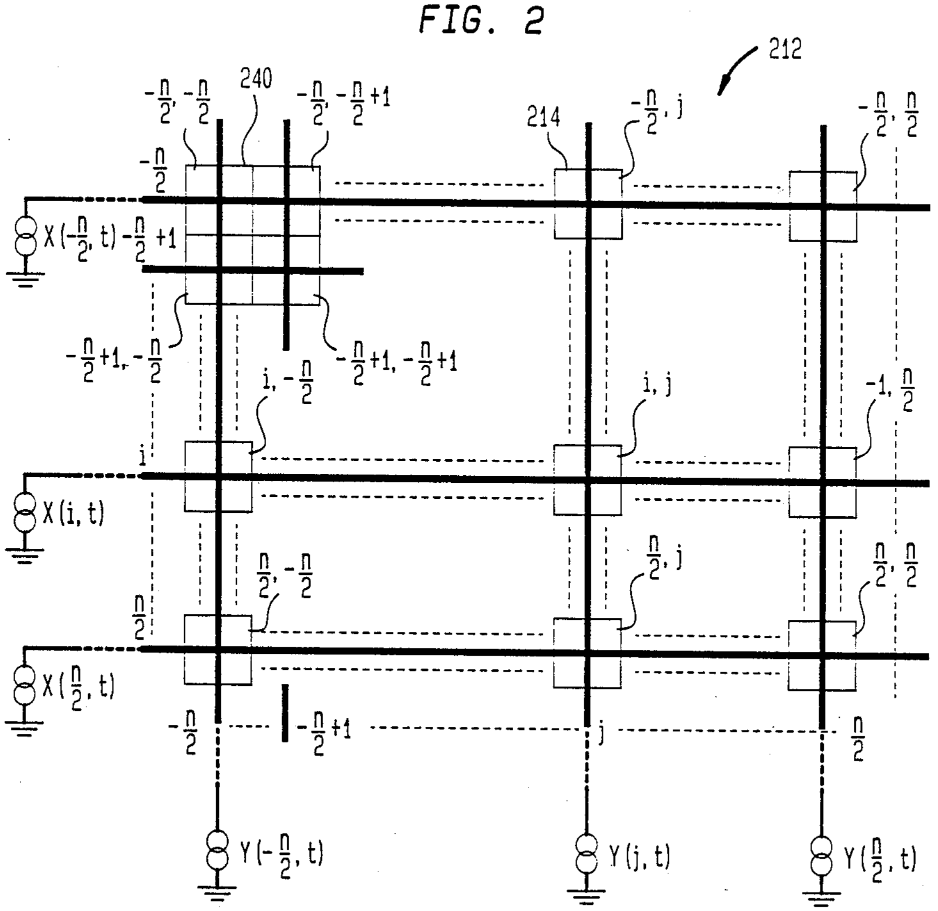
FIG. 2 is a schematic representation of a photodiode array in accordance with the present invention.
Figure 3:
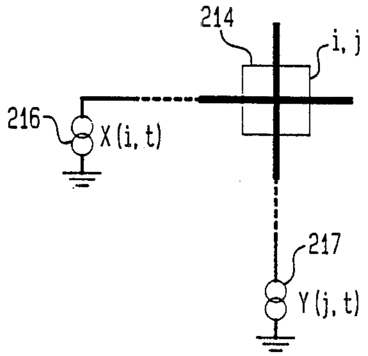
FIG. 3 is a schematic of a modulation scheme for the diodes of the array of FIG. 2.
Figure 4:
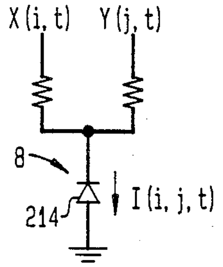
FIG. 4 is an alternative schematic of the modulation scheme shown in FIG. 3.

In a preferred embodiment, illustrated in FIG. 2, an imaging array 212 comprises a rectangular or square array of photodiodes. The effective gain of each diode 214 in the array can be controlled as a function of the bias voltage applied by voltage function generators 216 and 217, as shown in FIGS. 3 and 4. As an exemplary alternative, one could use a variably reflective surface such as a liquid crystal shutter to modulate the light intensity before its incidence on the array.

For the configuration of FIG. 2, the current in a diode 214 can be approximately characterized as:

$$i = K_0 + K_1 \cdot v \cdot q + f(v,q)$$

where i is the current, $K_0$ and $K_1$ are constants, v is the bias voltage, q the intensity of light incident the particular diode, see FIGS. 3 and 4, and f(v,q) comprises higher order terms in v, q or the combination.

The array 212 is subdivided into sub-arrays or superelements 240 which are sampled sequentially. In the embodiment of FIG. 2, each superelement 240 is constructed as an N×N array of pixels or photo diodes. In this case, N is even, so that i and j take on the values of $-\frac{1}{2}(n), \ldots, -1, 1, \ldots \frac{1}{2}(n)$. As indicated in FIGS. 3 and 4, generated voltage functions X(i,t) and Y(j,t) are summed at the diode at the intersection of row i and column j of array superelement 240. The resultant output current is then a function I(i,j,t) of row, column and time. Proper selection of diodes and pre-distortion of X(i,t) and Y(j,t) are used to minimize the effect of f(X+Y,q). Thus, $$\begin{aligned} I(i,j,t) &= K_0 + K_1 \cdot q(i,j) \cdot [X(i,t) + Y(j,t)] + f(X(i,t) + Y(j,t), q(i,j)) \\ &\approx K_0 + K_1 \cdot q(i,j) \cdot [X(i,t) + Y(j,t)] \end{aligned}$$

Voltage biases x and Y are applied in parallel to all superelements that go to make up the total array, and N is in the range from 8 to 100.

The bias voltages X and Y are selected so that:

$$X(i,t) = \sum_{k=0}^{K} A_k \cdot \alpha_k(i,t)$$

$$Y(j,t) = \sum_{l=0}^{L} B_k \cdot \beta_l(j,t)$$

where $\alpha_k(i,t_0)$ satisfies orthogonality with respect to k over i for a fixed $t_0$, and $\beta_o(j,t_0)$ satisfies orthogonality with respect to l over j for a fixed $t_0$. Also, $\alpha_k(i,t)$ and $\beta_1(j,t)$ satisfy orthogonality over a fixed interval of time T, for fixed $i_0$ and $j_0$, and orthogonality with respect to k and l, respectively, so that one can form:

$$\alpha_k(i,t) = \phi_k(i) \cdot \gamma_{k+1}(t)$$

$$\beta_1(j,t) = \theta_1(j) \cdot \gamma_{k+1+2}(t)$$

and make the substitution $$\phi_k(i) = \theta_k(i).$$

Thus, $$\alpha_k(i,t) = \phi_k(i) \cdot \gamma_{k+1}(t)$$

$$\beta_1(j,t) = \phi_1(i) \cdot \gamma_{k+1}(t)$$

where, $$\sum_{i=-N/2}^{N/2} \phi_m(i) \cdot \phi_n(i) = \begin{cases} \text{constant}, & m = n \\ 0, & m \neq n \end{cases}$$

and, $$\int_0^T \gamma_m(t) \cdot \gamma_n(t)\, dt = \begin{cases} \text{constant}, & m = n \\ 0, & m \neq n \end{cases}$$

and where, $$\int_0^T \gamma_0(t)\, dt = \text{constant}$$

and $$\int_0^T \gamma_m(t)\, dt = 0,\ m > 0.$$

Figure 5:
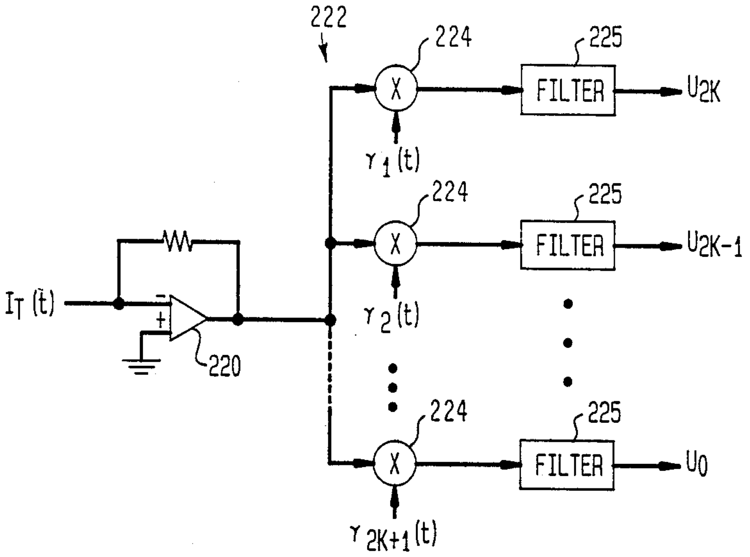
FIG. 5 is a schematic showing part of a signal processing system used in conjunction with the array of FIG. 2.

The currents from each element of each superelement are summed in a "virtual ground" amplifier 220, to form $I_T(t)$, as shown in FIG. 5, where $$I_T(t) = \sum_{i=-\frac{N}{2}}^{N/2} \sum_{j=-\frac{N}{2}}^{N/2} I(i,j,t)$$

The output of this amplifier 220 is divided at location 222 so it feeds 2K correlators 224 and filters 225. Walsh functions are used for $\gamma_n(t)$, so that the multipliers shown in FIG. 5 can be simple mixers.

The correlator outputs are sampled sequentially over all superelements. That is, all the filter outputs $u_k$ are sampled from one superelement, and then all the $u_k$ are sampled from the next superelement and so on until all of the superelements are sampled and then this cycle is repeated.

The output of the correlators is given by:

$$u_x = \int_0^T X(i,t) \cdot \gamma_{x+1}(t)\, dt = A_x \cdot \phi_x(i)$$

and $$u_{K+x} = \int_0^T Y(j,t) \cdot \gamma_{K+y+2}(t)\, dt = B_x \cdot \phi_x(j)$$

In the case where only one pixel receives a sudden change in illumination and this is detected on an moving target indicator (MTI) basis, the coordinates of the affected pixel are readily obtained:

$$u_0 = A_0 \cdot \phi_0(i) = A_0 \cdot K_0$$

$$u_1 = A_1 \cdot \phi_1(i) = A_1 \cdot K_0 \cdot i$$

$$u_2 = B_0 \cdot \phi_0(j) = B_0 \cdot K_0$$

$$u_3 = B_1 \cdot \phi_1(j) = B_0 \cdot K_0 \cdot j$$

for the case where $\phi_x(i)$ and $\phi_y(j)$ are quantized Legendre polynomials. Therefore, the coordinates of the i, j position can be computed by forming:

$$i = (A_0/A_1) \cdot (u_0/u_1)$$

$$j = (B_0/B_1) \cdot (u_3/u_2)$$

and where:

$$|u_0| \geqq |u_0' + \delta|$$

$$|u_2| \geqq |u_2' + \delta|$$

where $u_0'$ and $u_2'$ are the measured values of $u_0$ and $u_2$ at the previous sampling period for the superelement, and where $\delta$ is the MTI threshold.

For this case, the sampling rate for $10^8$ elements at 10 samples per second would be $10^9$ samples per second using the straightforward approach. Using a 16×16 superelement, the present invention provides for a factor of 64 reduction in the sampling rate:

$$f_s = \frac{10^9}{16^2} \cdot 4 = 15.625\ Msps$$

For the occurrence of more than one excited element per superelement, a problem arises in that there is uncertainty in how to pair up the x and y coordinates properly. This problem can easily be resolved if we examine the superelement again, this time with the biases on some of the potential pairings removed. Thus, if we have a potential pairing that disappears, we know that was the proper pairing. For the specific case of two excited elements in an superelement, a single examination of the superelement with one of the potential pairings suppressed is sufficient to unambiguously detect the correct pairing.

Figure 6:
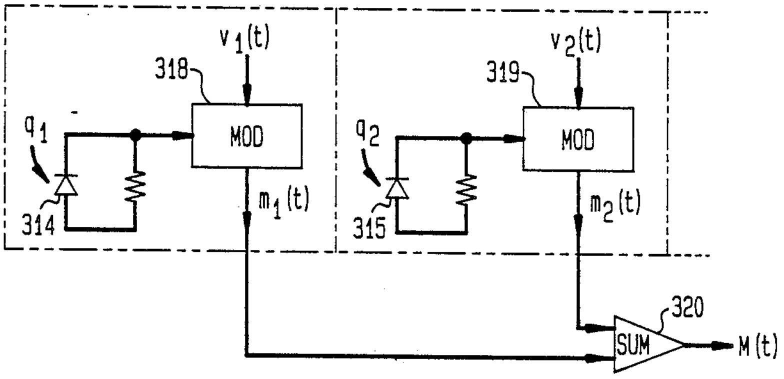
FIG. 6 is a schematic of a modulation scheme for photodiodes in accordance with the present invention.

In the embodiment of FIG. 6, the outputs of two elements 314 and 315 from a one-dimensional array of photodiodes are modulated by modulators 318 and 319 according to respective modulation functions $v_1(t)$ and $v_2(t)$.

The diodes are selected to provide output currents proportional to the incident light intensity so that the modulated output $m_k(t)$ 5 for the $k_{th}$ diode is proportional to $v_k(t) \cdot q_k$. The $m_k(t)$ are summed by amplifier 320 to Yield:

$$M(t) \propto v_1(t) \cdot q_1 + v_2(t) \cdot q_2$$

Thus, M(t) is a sum of terms, each of which is proportional to the incident light intensity and the modulation on a particular element. Assuming the incident light intensities are approximately constant over a sampling interval, since if the modulating signals $v_k(t)$ are chosen to be orthonormal signals over this interval, the single signal M(t) can be processed to recover each $q_k$.

In one aspect of the present invention, a number of spatially dependent weighting functions can be used to permit straightforward computations on sums of diode signals to determine the intensities of the light striking the array. This allows centralization of the processing of image arrays. It is described below for a one-dimensional array but is directly extendable to arrays of higher dimensionality.

Figure 7:
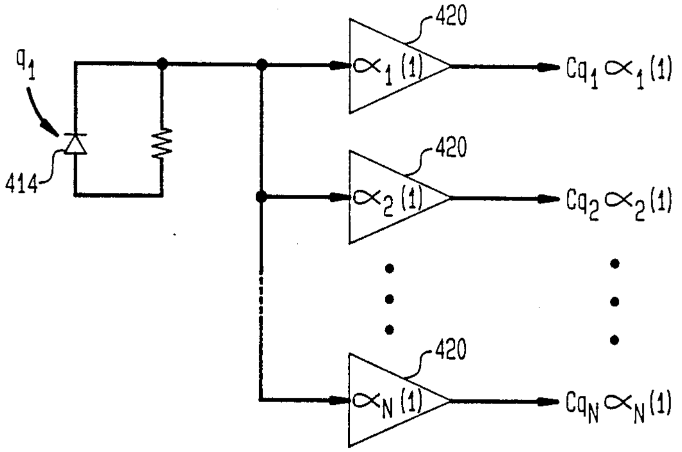
FIG. 7 is a schematic of an N-output photodiode in accordance with the present invention.

The N-output diode element 414 of FIG. 7 consists of a photo diode generating a voltage proportional to the incident light intensity $q_1$, which is then amplified by a factor of $\alpha_j(1)$, for the $j^{th}$ of the outputs. The amplifications are effect®d by parallel amplifiers 420.

Figure 8:
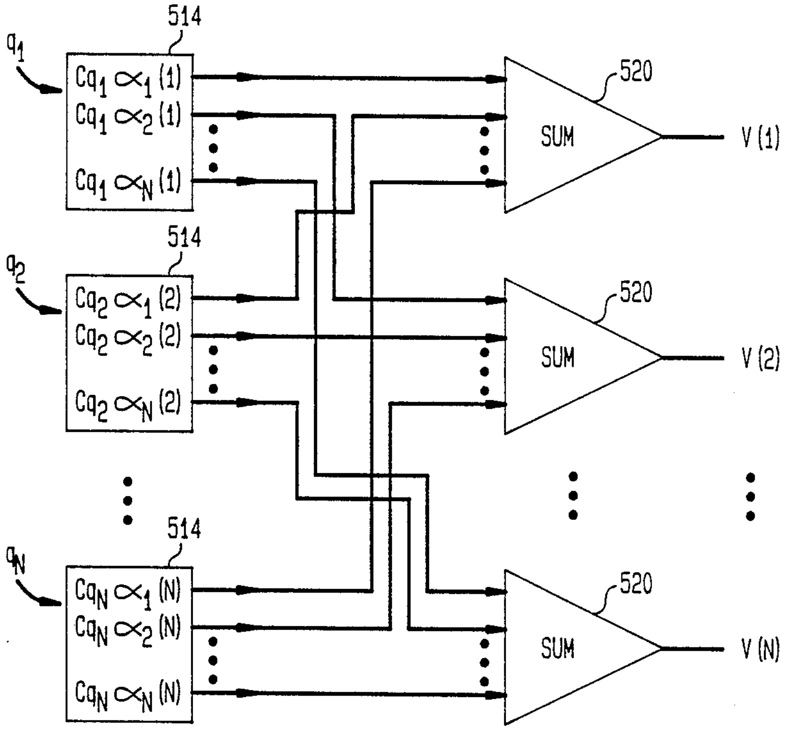
FIG. 8 is a schematic of a signal processing system using spatial weighting functions in accordance with the present invention.

Consider the use of N of these N-output diode elements 514 in an Nxl array to detect the light intensity incident where the N diodes are located. The configuration and interconnection of these elements are shown in FIG. 8. As is illustrated, the signal from the $j^{th}$ output of one of the N-output diode elements is summed, by a respective one of N summers 520, with the output from the $j^{th}$ element of each of the other (N−1) N-output diode elements. This forms the N sums V(1), . . . , V(N), where $$V(j) = \sum_{k=1}^{N} C \cdot q_k \cdot \alpha_j(k)$$

where C is a constant.

This set of equations can conveniently be expressed in matrix forms as:

$$V = Aq$$

where

-continued $$V = \begin{bmatrix} V(1) \\ \cdot \\ \cdot \\ V(n) \end{bmatrix} \text{ and } q = \begin{bmatrix} q1 \\ \cdot \\ \cdot \\ qN \end{bmatrix}$$

and $$A = [a_{jk}] = [C \cdot \alpha_j(k)].$$

Thus, we have available V through measurements, A is a matrix of weights which we can choose and q is of interest. Therefore, if A is chosen to be an invertible matrix, q can be calculated in a straightforward manner:

$$q = A^{-1} \cdot V$$

In particular, for the case where N is odd, one can renumber the elements −K, . . . , 0, . . . K, where $K = \frac{1}{2}(N-1)$, and choose the coefficients $\alpha_j(-k), \ldots, \alpha_j(k)$ as samples of the $j^{th}$ order Legendre polynomials over the interval [−K,K]. Then the weight matrix A is orthogonal, and is thus easily invertible.

Modulation tagging of diode signals can be combined with spatial weighting so that multiple-output diodes are not required. This technique can be used to advantage in large arrays of photo diodes, where centralized processing is desired, but use of multiple output diode elements is impractical. The approach will be described for a one dimensional array, but is directly extendable to arrays of higher dimensionality.

As above, an Nxl array of multiple output diode elements can be used to format the signals V(1), . . . , V(N), where $$V(j) = \sum_{k=1}^{N} C \cdot q_k \cdot \alpha_j(k)$$

and where C is a constant, $q_k$ is a measure of light intensity incident on the $k^{th}$ diode, and $\alpha_j(k)$ is the weighting applied to the jth output of the $k^{th}$ multiple output diode element. As described above, $q_1, \ldots, q_n$ can be determined from the signals V(1), . . . , V(N).

Figure 9:
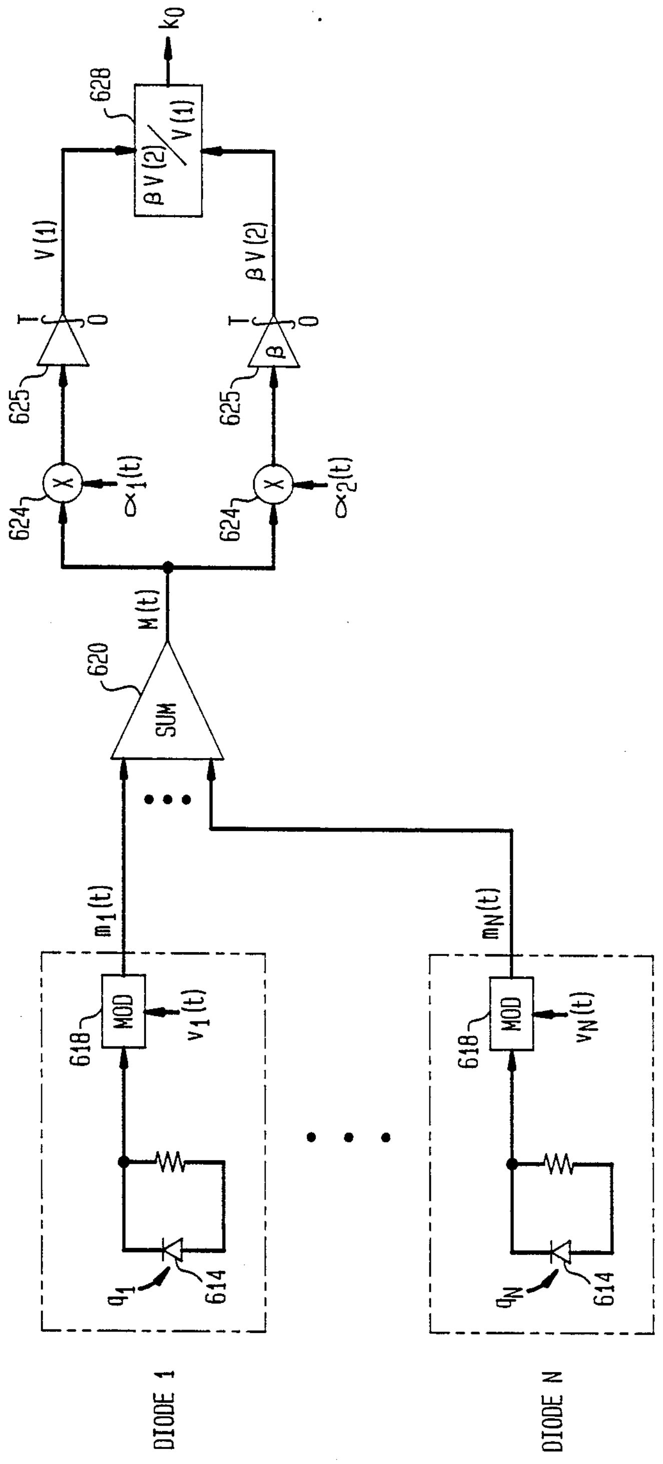
FIG. 9 is a schematic of a single element detection implementation of the present invention.

In the embodiment of FIG. 9, N diodes 614 are arranged in an N×1 array to measure the light intensity incident on the N photo-sensitive diodes 614. The diode outputs are modulated according to respective modulation functions $v_k(t)$ applied by modulators 618.

An amplifier 620 sums modulator outputs $m_k(t)$ to yield a combined output M(t). As described above, the illumination dependent output from the kth diode can be described as:

$$m_k(t) = C \cdot q_k \cdot v_k(t)$$

Thus, M(t) is given by:

$$M(t) = \sum_{k=1}^{N} m_k(t) = C \sum_{k=1}^{N} q_k \cdot v_k(t)$$

The modulation functions are selected to have the form:

$$v_k(t) = \alpha_1(k)\gamma_2(t) + \alpha_2(k)\gamma_2(t) + \ldots + \alpha_N(k)\gamma_N(t)$$

where $\gamma_1(t), \ldots, \gamma_N(t)$ form an orthonormal set of time functions over the interval [O,T], such as Walsh functions. Thus:

$$M(t) = C \sum_{k=1}^{N} q_k \left\{ \sum_{l=1}^{N} \alpha_1(k) \cdot \gamma_1(t) \right\} = C \sum_{l=1}^{N} \gamma_1(t) \left\{ \sum_{k=1}^{N} q_k \cdot \alpha_1(k) \right\}$$

The mixers 624 and filters 625 yield inner products between M(t) and the time functions $\gamma_j(t)$. The inner product between M(t) and the $j^{th}$ orthogonal time function $\gamma_j(t)$ is:

$$\langle M(t), \gamma_j(t) \rangle = C \cdot \sum_{k=1}^{N} q_k \cdot \alpha_j(k)$$

which is identical to V(j), and the set V(1), . . . , V(N) was shown to contain all the intensity information in a recoverable form. Thus, M(t) is a single signal formed as the sum of illumination dependent signals which are appropriately modulated, and can be processed in a straightforward manner to obtain the desired illumination information.

If only one pixel is non-zero, we can determine its location. As above, indices range from −K to K, where $K = \frac{1}{2}(N-1)$, and the Legendre polynomial approach leads to the following weight coefficients:

$$a_{jk} = c_j \cdot P_j(K/K), \; j,k = -K, \ldots, K$$

where $c_j$ is a constant. Specifically, the first two rows of matrix A are given by:

$$a_{1k} = c_1$$

$$a_{2k} = c_2 \cdot k$$

where k = −k, . . . ,0, . . . ,K.

If, for example, $q_{k0}$ is the only non-zero reading, then $q_{k0}$ and $k_0$ can be determined from the first two inner products, since:

$$V(1) = c_1 \cdot q_{k0}$$

$$V(2) = c'_2 \cdot q_{k0} \cdot k_0$$

Thus, determination of $k_0$ is given by:

$$k_0 = B \cdot \frac{V(2)}{V(1)}$$

where the constant B can be easily eliminated in forming the inner products. This last division can be performed by a processor 628.

Thus, several embodiments of the present invention and variations thereof have been disclosed. From the foregoing it is clear that the present invention is applicable to detection systems for a wide variety of spatial distribution variables, and is not limited to photo-detection. Different modulation and processing schemes can be used. Accordingly, the present invention is limited only by the scope of the following claims.

What is claimed is:

1. A signal detection and processing system comprising:

an array of detectors, each detector being adapted for providing an output representing the value of a variable of interest incident the detector;

modulation means for modulating the output of each said detector by a respective plurality of time-varying functions which are mutually orthogonal over a predetermined time interval; and summing means for summing the modulated outputs of said detectors.

2. The system of claim 1 further comprising correlator means for correlating the output of said summing means with respective ones of said time-varying functions, sampling means for sampling the output of said correlator means over an interval over which said time-varying functions are orthogonal, said sampling means including a signal processor for processing the output of said correlator means for providing information on the spatial distribution of said variable of interest incident said array.

3. The system of claim 2 wherein said time-varying functions are mutually orthonormal.

4. The system of claim 1, wherein the modulation means modulates the output of each said detector by a respective weighted set of the respective plurality of time-varying functions associated with said detector.

5. The system of claim 4 wherein the number of said time-varying functions is equal to the number of detectors, and wherein the weights applied in summing said time-varying function constitute an invertible matrix.

6. The system of claim 5 where the rows of said invertible matrix correspond to the weightings applied to respective ones of said detectors and the columns of said invertible matrix correspond to respective ones of said time-varying functions.

7. The system of claim 6 wherein said signal processor determines when a change in intensity is detected by any detector in said array.

8. The system of claim 7 wherein said signal processor determines from the output of said sampling means which detector of said array has detected a change in said variable of interest when only one detector has detected such a change.

9. The system of claim 7 wherein said signal processor determines which of said detectors has detected a change in said variable of interest when plural detectors have detected such a change.

10. The system of claim 3 wherein said array is rectangular and the number of time-varying functions is equal to the number of rows of the array plus the number of columns in said array.

11. The system of claim 10 wherein the modulation means modulates the output of each said detector by a respective weighted sum of the respective plurality of time-varying functions associated with said detector, and the weights applied to said time-varying functions constitute an invertible matrix with the number of elements in the matrix equalling the square of the number of said time-varying functions.

12. The system of claim 11 wherein said processor determines when a change in intensity is detected by any detector in the array.

13. The system of claim 12 wherein said processor determines which detector of said array has detected a change in intensity when only one of said detectors detects such a change in a sampling interval.

14. The system of claim 13 further comprising means for generating said time-varying functions, and means for communicating between the means for generating and the processor, and wherein the processor turns off selected ones of said time-varying functions to resolve ambiguities through examination of multiple samples when plural detectors detect changes in said variable of interest.

15. The system of claim 2 wherein said correlating means includes correlators configured in parallel, each correlator being arranged to correlate the output of said summing means with a respective one of said time-varying functions.

16. The system of claim 15 wherein said sampling means includes analog-to-digital converters, with each converter being in communication with a respective one of said correlators and said signal processor.

17. The system of claim 3 wherein said modulation means generates a set of Walsh functions.

18. The system of claim 1 wherein said detectors are photodiodes.

19. The system of claim 18 wherein said modulation means includes means for varying the bias across each of said photodiodes.

20. The system of claim 2 wherein the correlator means includes a plurality of correlators arranged in parallel and each of the correlators has an output, and the sampling means includes a plurality of analog-to-digital convertors arranged in parallel between the correlators, each of the analog-to-digital converters having an input connected to a respective one of the outputs of the correlators, and having an output connected to the signal processor.

21. The system of claim 20 further comprising:

means for generating said time-varying functions, said means including a plurality of outputs upon which signals corresponding to said time-varying functions are placed, and wherein the outputs of the means for generating are connected to respective ones of the correlators so that respective correlators receive respective ones of the signals corresponding to said time-varying functions.

22. A method of image processing comprising:

detecting a scene with an array of detectors, each detector being adapted for providing an output representing the intensity of radiation incident that detector;

modulating the output of each detector by a plurality of weighted time-varying functions that are orthogonal over a predetermined time interval; and summing the modulated outputs.

23. The method of claim 22 further comprising:

correlating the summed signal with respective ones of said time-varying functions;

sampling each correlated signal over a time interval over which said time-varying functions are orthogonal; and processing the samples to obtain information regarding the spatial distribution of radiation incident said detector array.

24. The method of claim 23 wherein said time-varying functions are orthonormal.

25. The method of claim 24 wherein said time-varying functions are Walsh functions.

26. The method of claim 23 wherein the weights applied in summing said time-varying functions constitute an invertible matrix.

27. The method of claim 26 wherein the weights applied in summing said time-varying functions are the coefficients of quantized Legendre polynomials.

28. The method of claim 23 wherein the number of time varying functions equals the number of detectors.

29. The method of claim 28 wherein said samples are processed to determine the intensity of radiation incident each of said detectors.

30. The method of claim 23 wherein said array is rectangular and the number of time-varying functions is the sum of the number of rows of said array and the number of columns of said array.

31. The method of claim 30 further comprising the steps of determining when multiple detectors detect a change in intensity, and in the event of such a multiple detection, shutting off selected time-varying functions so that detector determination ambiguities can be resolved successive sampling periods.

32. The method of claim 23 wherein said samples are processed to determine when a change in detected intensity has occurred and to identify the detector detecting the change when only one detector has detected such a change.

33. The method of claim 22 wherein the modulation is applied by varying the bias across each of said detectors.

34. A method of processing data from a predetermined number of detectors, said method comprising the steps of:

modulating the output of each detector by a plurality of weighted time functions which are mutually orthonormal over a predetermined time interval, the number of said time functions equaling at least the number of said detectors, the weighting factors taken over each time function and each detector defining an invertible matrix;

summing the modulated outputs;

dividing the summed signal so formed into parallel channels;

correlating the summed signal in each said parallel channel with a respective one of said time functions; and sampling the correlated signal over a time over which said time functions are orthonormal.

35. A method of recoverably multiplexing data output from a predetermined number of detectors for a variable of interest, said method comprising the steps of:

calibrating each of said detectors to minimize response non-linearities;

selecting a time interval which is small relative to the frequency of changes in said variable of interest;

forming a vector, the elements of which define a set of time functions that are orthonormal over said time interval;

36. The method of claim 35 wherein said modulation functions are applied to the detector outputs after event detection.

37. A method of processing image data output from an array of radiation intensity detectors, said method comprising the steps of:

applying a set of modulation functions to modulate the output of said array, said set of modulation functions being mutually orthogonal over a predetermined time period;

summing the modulated outputs;

splitting the summed signal into parallel channels;

correlating the summed signal in each of said parallel channels with a respective of said functions; and processing the correlated signals to obtain intensity distribution data.

forming an invertible matrix of scalers;

multiplying said vector and said matrix to form a modulation matrix, each element of said modulation matrix being the product of the respective element of said scaler matrix and a time function corresponding to the column position of the element of said modulation matrix;

modulating the output of each detector by the sum of the elements of a respective row of said modulation matrix; and summing the modulated outputs.

38. In a system for detecting at least one variable of interest incident upon an array of detectors, a method of processing electromagnetic signals from an array of detectors arranged in rows and columns, the method comprising the steps of:

modulating the output of each detector of said array according to a composite modulation function so that the output is the sum of a row modulation function and a column modulation function, each row modulation function and each column modulation function being a plurality of weighted time functions which are mutually orthogonal over a predetermined time interval, the weight defining an invertible matrix; and summing the modulated outputs.

39. The method of claim 38 further comprising the steps of:

after summing, transmitting said summed signal in parallel along plural channels; and correlating the summed signal in each channel by a respective one of said time functions.

40. The method of claim 39 further comprising the step of sampling the correlated signals over a time interval over which said time functions are orthonormal.

41. A system for analyzing the spatial distribution of a variable referable to an event of interest comprising:

a number of detectors, each adapted for providing an output as a function of said variable;

modulation means for modulating the output of each said detector in response to a respective modulation function;

function generators for providing modulation functions to said modulation means, said function generators being adapted for providing set of modulation functions each of which is a weighted set of orthogonal time functions; and summing means for summing modulated outputs from said detectors.

42. The system of claim 41 further comprising:

means for transmitting the output of said summing means along parallel channels; and correlating means for correlating the summed signal of each parallel channel with a respective of said orthogonal functions.

43. The system of claim 42 further comprising processing means for processing the outputs of said correlator means so as to at least partially reconstruct the spatial distribution of the variable of interest.

44. The system of claim 43 wherein said processing means includes sampling means for sampling the outputs of said correlating means over an interval over which said time functions are orthogonal.

45. The system of claim 41 further characterized in that said modulation means applies modulation to the output of said detectors after detection of the variable of interest.

46. The system of claim 41 further characterized in that said function generators generate one function for each detector so that the spatial distribution of said variable of interest is completely recoverable from the summed output signal with the information from a single sampling interval.

47. The system of claim 46 further comprising means for processing said correlator outputs so that the address of a single detector detecting an event can be determined.

48. The system of claim 47 further characterized in that the means for processing alters selected modulation functions so that ambiguities introduced by events exciting multiple detectors can be resolved by successive samplings.

49. The system of claim 41 further characterized in that said detectors are arranged in a rectangular array, and in that said modulation means applies to each detector a modulation function that is the sum of a respective row function and a respective column function, each row function and each column function being the weighted sum of time functions which are orthogonal over predetermined time interval.

50. The system of claim 49 further characterized in that said function generators provide a modulation function for each row and each column of said array.

51. The system of claim 41 further characterized in that said function generators are adapted for generating modulation functions in the form of weighted orthonormal time functions.

52. The system of claim 41 further characterized in that said detectors are photodiodes.

53. The system of claim 52 further characterized in that said modulation means modulates the output of said photodiodes by varying the biases across the photodiodes.

54. The system of claim 41 further characterized in that said processing means processes said correlated signals so that the row and column of a single excited detector or said array can be determined.

55. The system of claim 54 further characterized in that said processing means selectively disables predetermined modulation functions so that in the event of the excitation of multiple detectors, ambiguities can be resolved by successive samplings.

* * * * *